(12) United States Patent
Chiang (10) Patent No.: US 7,248,464 B1
(45) Date of Patent: Jul. 24, 2007

(54) STRUCTURE OF A COMPUTER HOUSING

(76) Inventor: Ming-Huang Chiang, PO Box 82-144, Taipei (TW)

( * ) Notice: Subject to any disclaimer, the term of this patent is extended or adjusted under 35 U.S.C. 154(b) by 0 days.

(21) Appl. No.: 09/450,417

(22) Filed: Nov. 30, 1999

(51) Int. Cl.
*G05F 1/16* (2006.01)
(52) U.S. Cl. ...................... 361/683; 361/724; 361/399; 312/111
(58) Field of Classification Search ................ 361/679, 361/683, 686, 724–727, 807–811; 29/11; 211/189–192, 195, 198–201
See application file for complete search history.

(56) References Cited

U.S. PATENT DOCUMENTS 4,836,626 A * 6/1989 Taylor et al. ........ 312/257 SM
4,979,075 A * 12/1990 Murphy ...................... 361/399
5,810,459 A * 9/1998 Barrett et al. ................ 312/111

* cited by examiner

*Primary Examiner*—Darren Schuberg
*Assistant Examiner*—Yean-Hsi Chang
(74) *Attorney, Agent, or Firm*—Leong C. Lei (57) ABSTRACT

An improved structure of a computer housing comprising a front side board, a rear side board, a top side board, a bottom side board, a left side board, and a right side board, characterized in that a plurality of pivot members are hingedly disposed along the edges of the respective side boards, the side boards having one edge adjacent to other side boards, a plurality of securing seat plates are provided on the from side board for the mounting of a optical disc, a hard disc and soft disc, a holding seat plate is disposed on the rear side board for the mounting of a power source supply, and a plurality of the pivot members are formed along one edge of the front side board and a rear side board such that the computer housing can be spread out on as a flat plan. The present computer housing requires a small space for transportation and therefore the cost of transportation is greatly saved. In addition, the present invention provides a convenient installation and maintenance.

1 Claim, 8 Drawing Sheets

STRUCTURE OF A COMPUTER HOUSING

BACKGROUND OF THE INVENTION (a) Field of the Invention

The present invention relates to computer housing, and in particular, a computer housing having a front side board, a rear side board, a top side board, a bottom side boards, etc being pivotally hinged with other at the adjacent edges of the boards, thereby, a comparative smaller space is required during shipping of the housing and the housing facilitates maintenance of the computer.

(b) Description of the Prior Art

Figure 1:
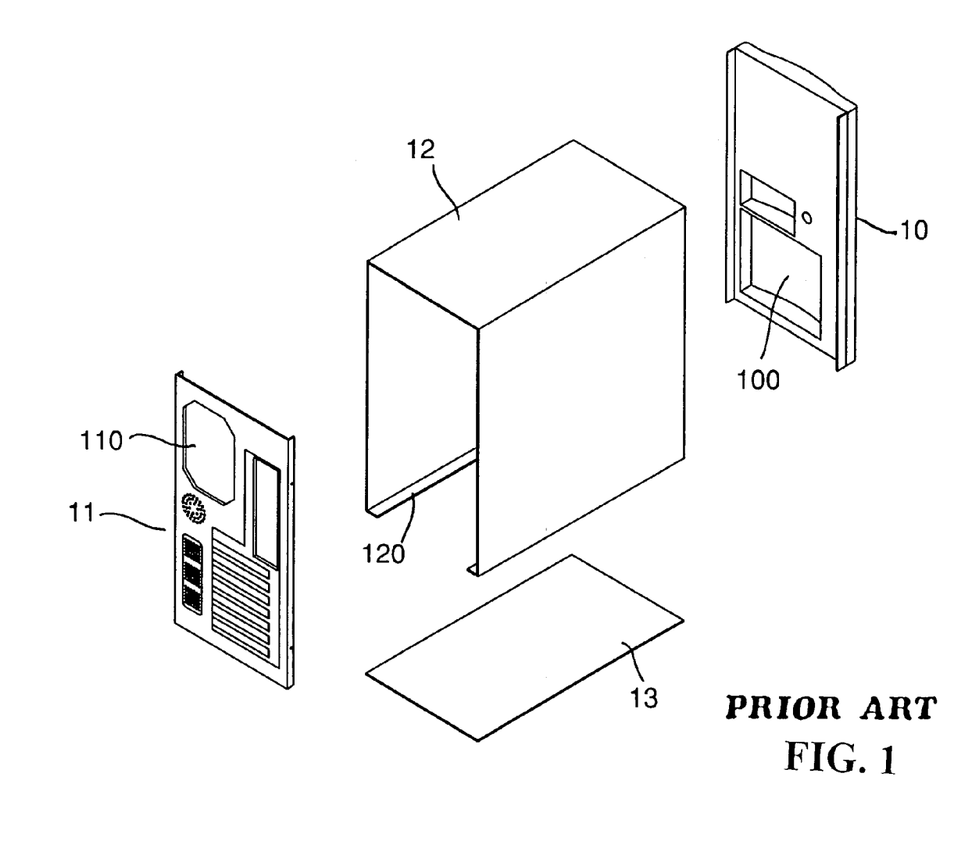
FIG. 1 is an exploded view of a conventional computer housing.
Figure 2:
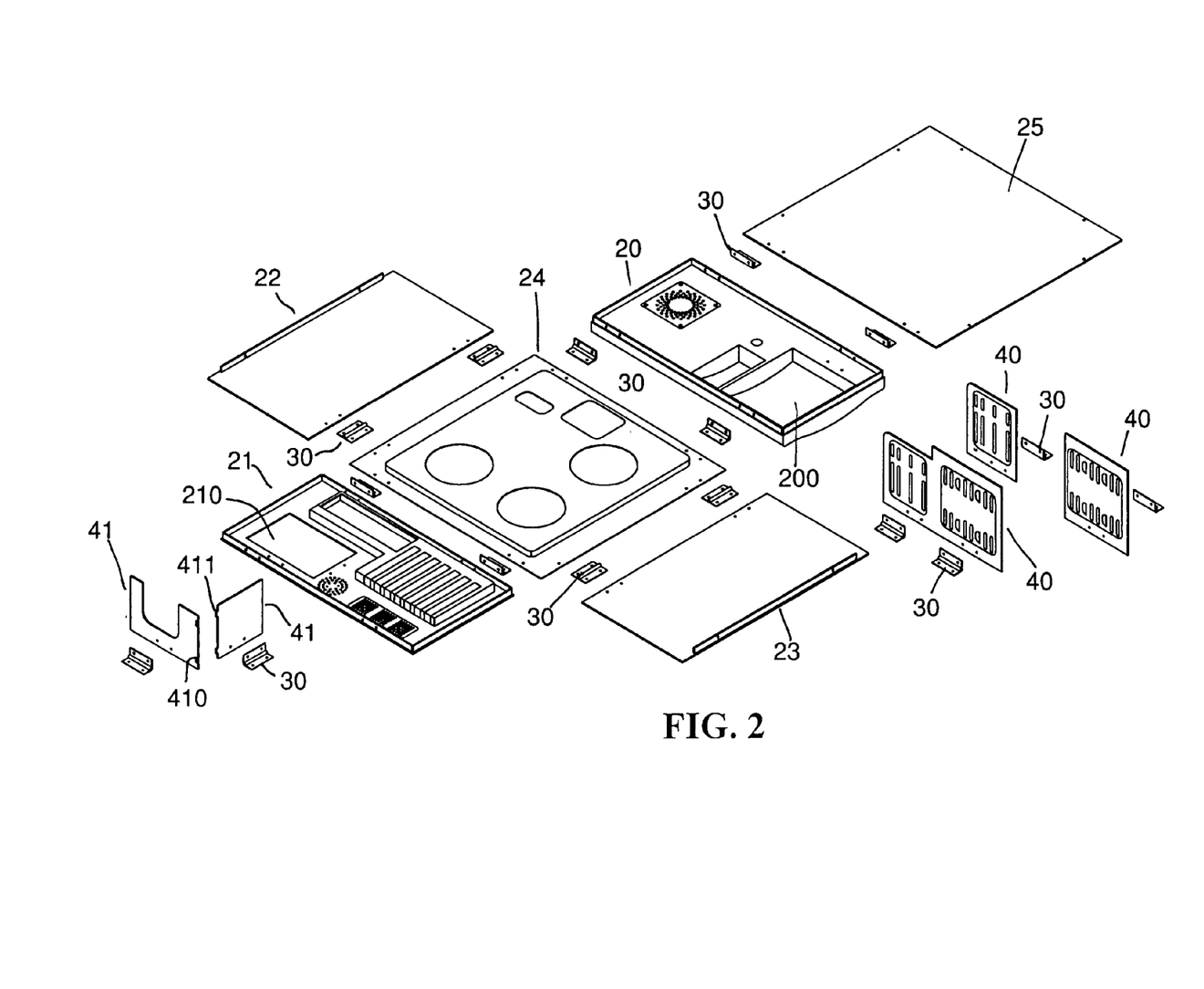
FIG. 2 is a perspective exploded view of a computer housing in accordance with the present invention.
Figure 3:
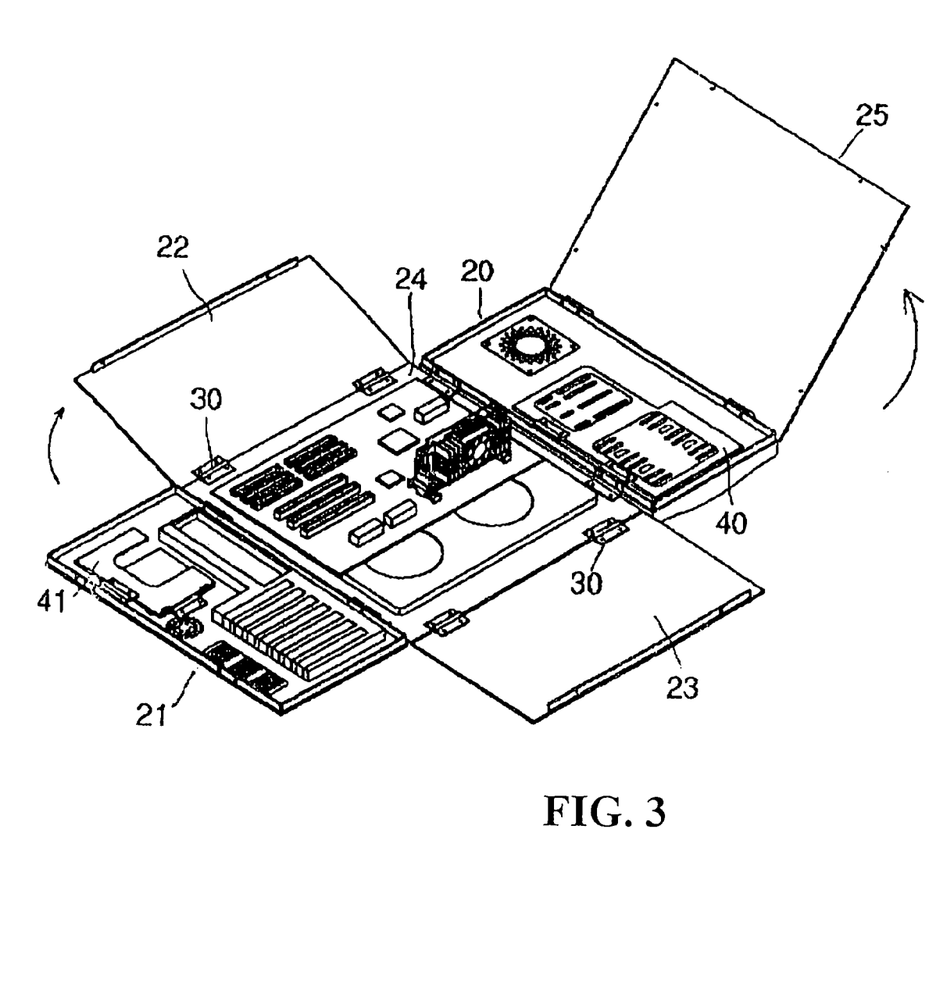
FIG. 3 is a perspective view showing the folding of the side boards of a computer housing in accordance with the present invention.
Figure 4:
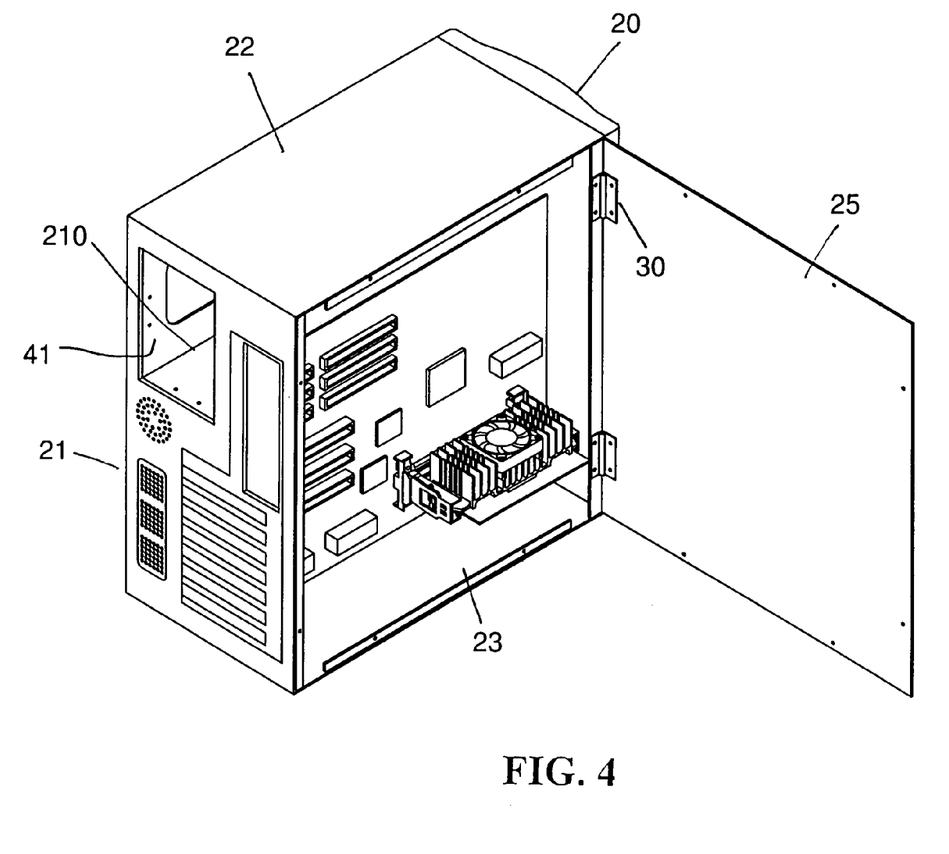
FIG. 4 is a perspective view showing an application of a computer housing in accordance with the present invention.

Referring to FIG. 1, there is shown a conventional computer housing comprising a front side board 10, a rear side board 11, a covering plate 12 and a base plate 13. The front side plate 10 is provided with a plurality of slots 100 to mount with a securing plate so as to mount an optical disc, a hard disc and a soft disc. A through hole 110 is provided on the rear side board 11 and is associated with a holding plate to hold a power supply. The covering plate is substantially an inverted "U" shaped and a protruded disc plate 120, bending inward, being provided at the bottom section of the two sides. The base plate 13 is a rectangular shape disc-like member.

In order to assemble the essential parts of a computer, these parts, such as the optical disc, hard disc and the soft disc are respectively mounted at the front side board 10 and the rear side board 11 or in between, and the bottom side of the front side board 10 and the rear side board 11 are mounted at the two side edges of the base plate 13, Then, the opening of the covering plate 12 is opened and the and the rear side board 11 is pushed forward to the front side board 10 until it is all covered. Finally, screws are used to mount the two sides of the base plate 13 at the protruded plate 120 of the covering plate 12.

Such computer housing has the following drawbacks in assemble and in use:

(a) The volume of the housing is large and the transportation cost is high: As the computer housing has a covering plate 12 and is substantially inverted "U" shaped, therefore, the computer housing occupies a larger space and the cost of transportation is increased.

(b) Assembly and maintenance of the computer are not easy. The entire housing has to be placed downward and to detach the base plate 13 and the covering plate 12 in order to access to the interior of the computer.

SUMMARY OF THE INVENTION

One aspect of the present invention is to provide an improved structure of a computer housing comprising a front side board, a rear side board, a top side board, a bottom side board, a left side board, and a right side board, characterized in that a plurality of pivot members are hingedly disposed along the edges of the respective side boards, and the side boards are arranged adjacent to other side boards, a plurality of securing seat plates are provided on the front side board for the mounting of an optical disc, a hard disc and soft disc, a holding seat plate is disposed on the rear side board for the mounting of a power source supply, and a plurality of the pivot members are formed along the edges of the front side board and a rear side board, such that the computer housing can be spread out on as a flat plan before forming into a box-like casing.

It is an object of the present invention to provide an improved structure of a computer housing, wherein the computer housing does not occupy space and therefore it facilitates space for transportation and shipping, and the cost of transportation is thus greatly minimized.

Yet another object of the present invention is to provide an improved structure of a computer housing, wherein the assembly of the computer housing is easy, and the maintenance of the computer is convenient.

Other objects, advantages, and novel features of the invention will become more apparent from the following detailed description when taken in conjunction with the accompanying drawings.

DETAILED DESCRIPTION OF THE INVENTION

Figure 5:
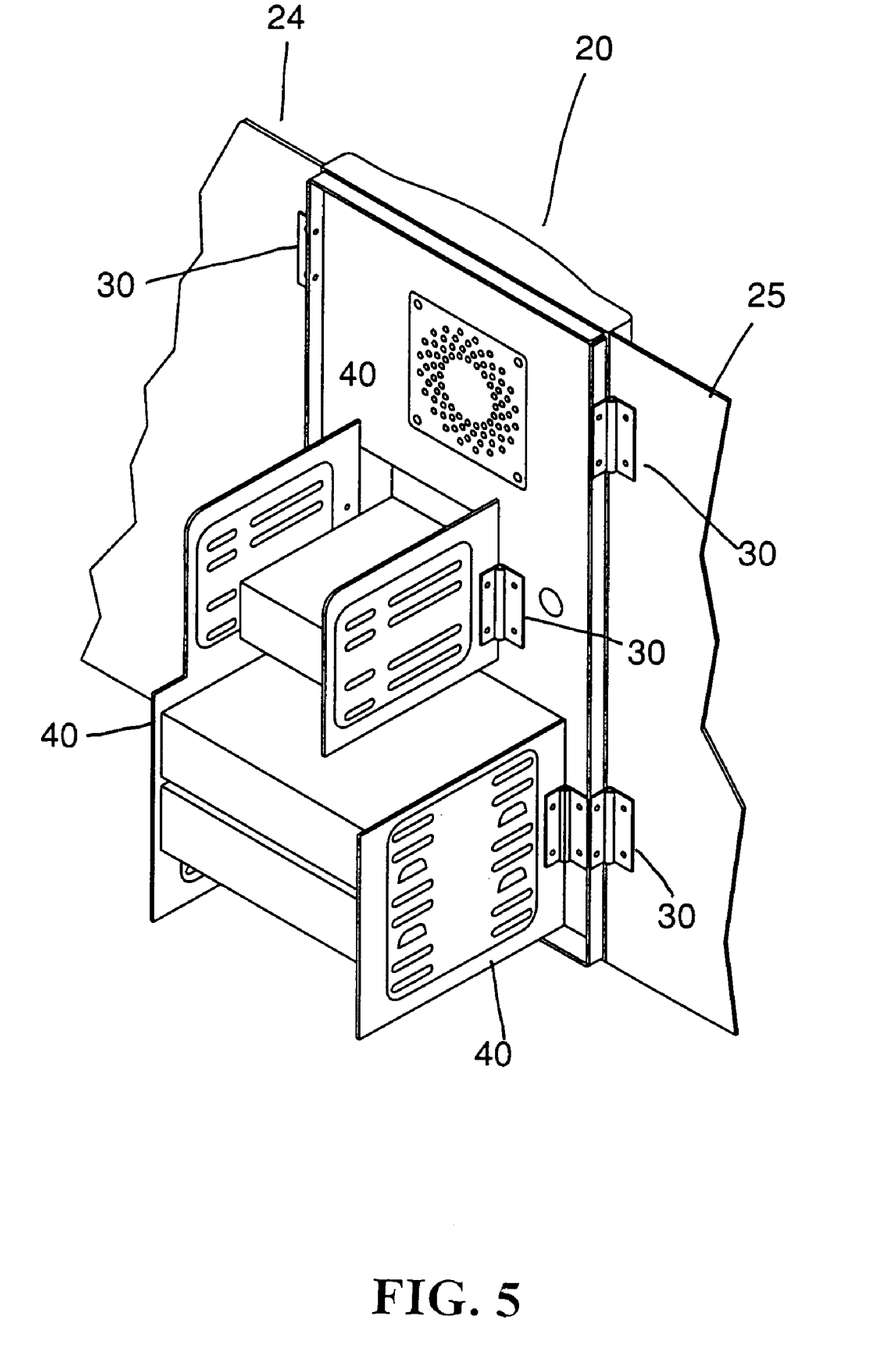
FIG. 5 is a perspective view showing the mounting of the securing seat plates of a computer housing in accordance with the present invention.
Figure 6A:
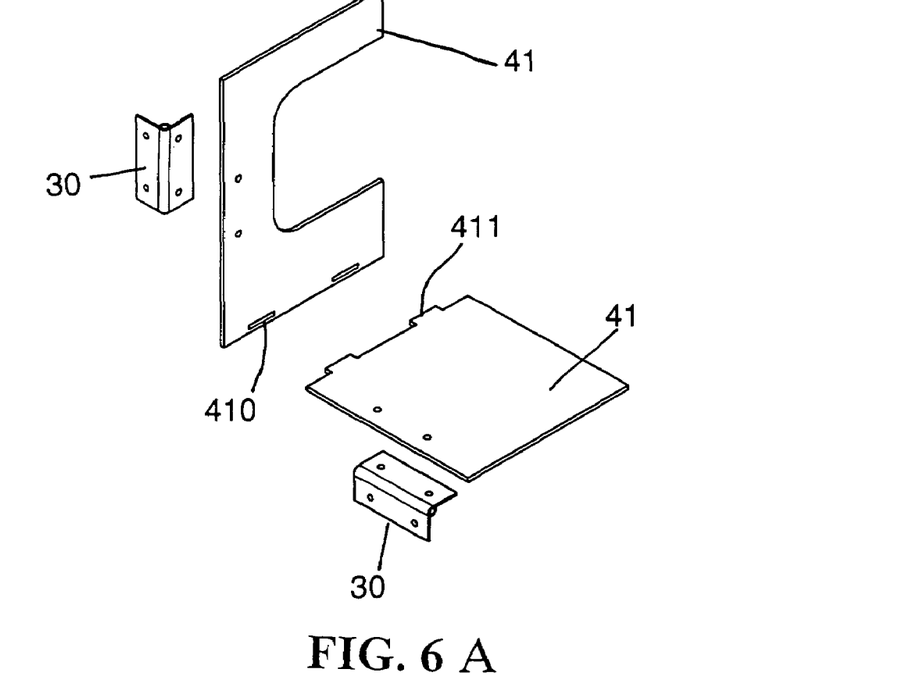
FIGS. 6A and 6B illustrate assemble of the holding seat plates onto a side board of a computer housing in accordance with the present invention.
Figure 6B:
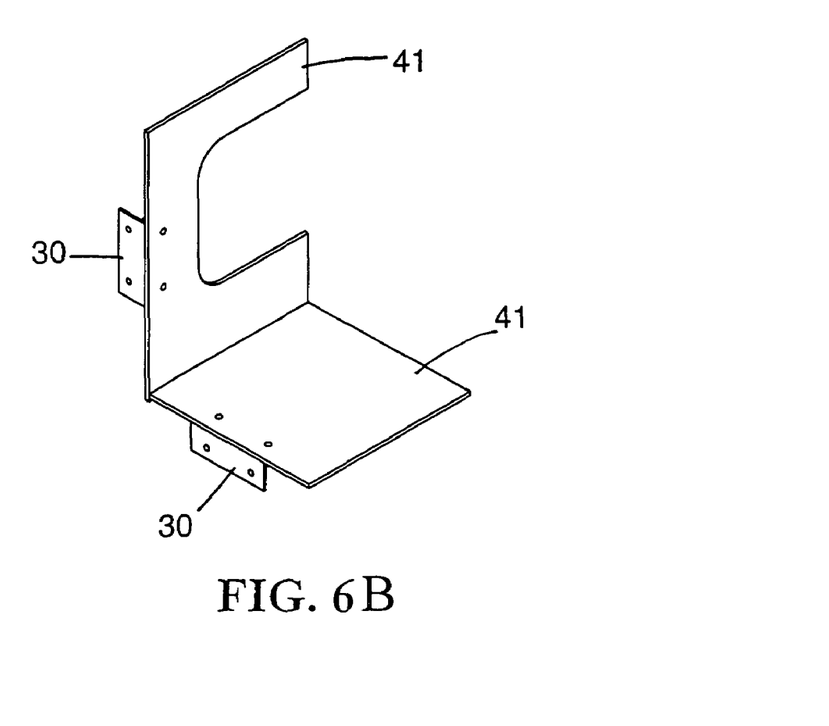
Figure 7A:
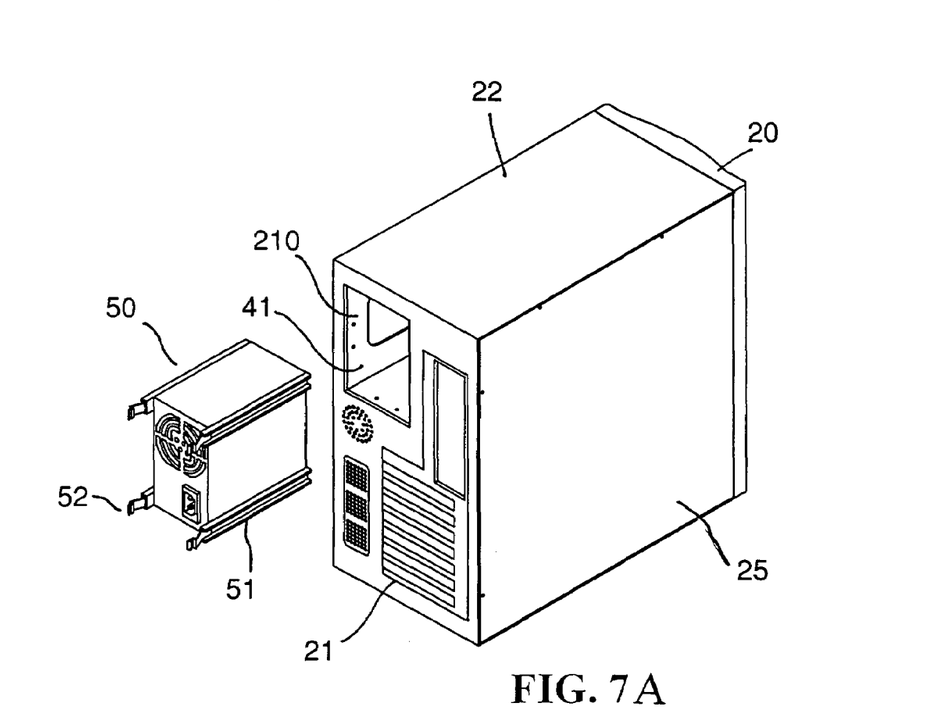
FIGS. 7A and 7B illustrate the mounting of a power source supply onto the computer housing in accordance with the present invention.
Figure 7B:
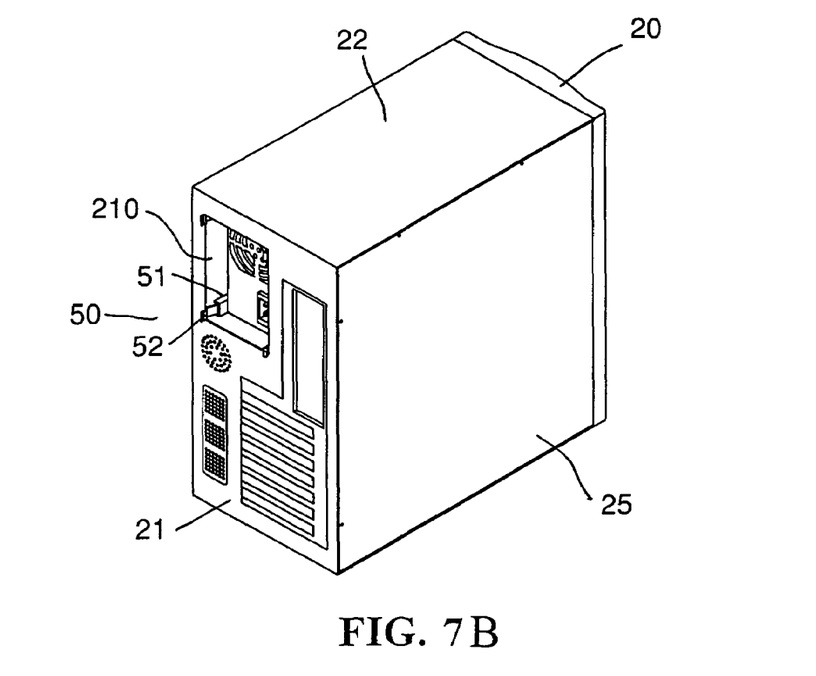

Referring to FIGS. 2, 3, 4, 5, 6A, 6B, 7A and 7B, there is shown an improved structure of a computer housing comprising a front side board 20, a rear side board 21, a top side board 22, a bottom side board 23, a left side board 24, a right side board 25. A plurality of pivot members 30 are hingedly disposed along the edges of the respective side boards. The side boards have one edge adjacent to other side boards, and a plurality of securing seat plates 40 are provided at the front side board 20 for the mounting of an optical disc, a hard disc and soft disc, as shown in FIG. 5. On the rear side board 21, an opening 210 is provided and the lateral side of the opening 210 is provided with a plurality of pivot members 30. A holding seat plate 41, including a vertical plate and a horizontal plate, is formed into an L-shaped member, wherein the lower edge of the vertical plate is provided with a plurality of engaging slots 410. One side edge of the horizontal plate is provided with a plurality of protruded disc 411 such that the vertical plate is connected to the horizontal plate to form the L-shaped member via the engagement of the protruded disc 411 with the engaging slot 410. The L-shaped member is used to hold a power source supply 50, which is shown in FIGS. 6A and 6B. The four corners of the top and bottom side of the power source supply 50 are each provided with an engaging rod 51 and the end portion of the engaging rod 51 is provided with a flexible engaging member 52, which can engage at the edge of the opening 210 of the rear side board 21. Thus, this structure allows an effective function in disassembly of the power source supply 50, as shown in FIGS. 7A and 7B.

In accordance with the present invention, the pivot members 30 are hinge structure and a plurality of screws are used to mount the hinge structure onto the side boards at the edges thereof or by welding the hinge structure onto the side board at the edges thereof.

Figure 8:
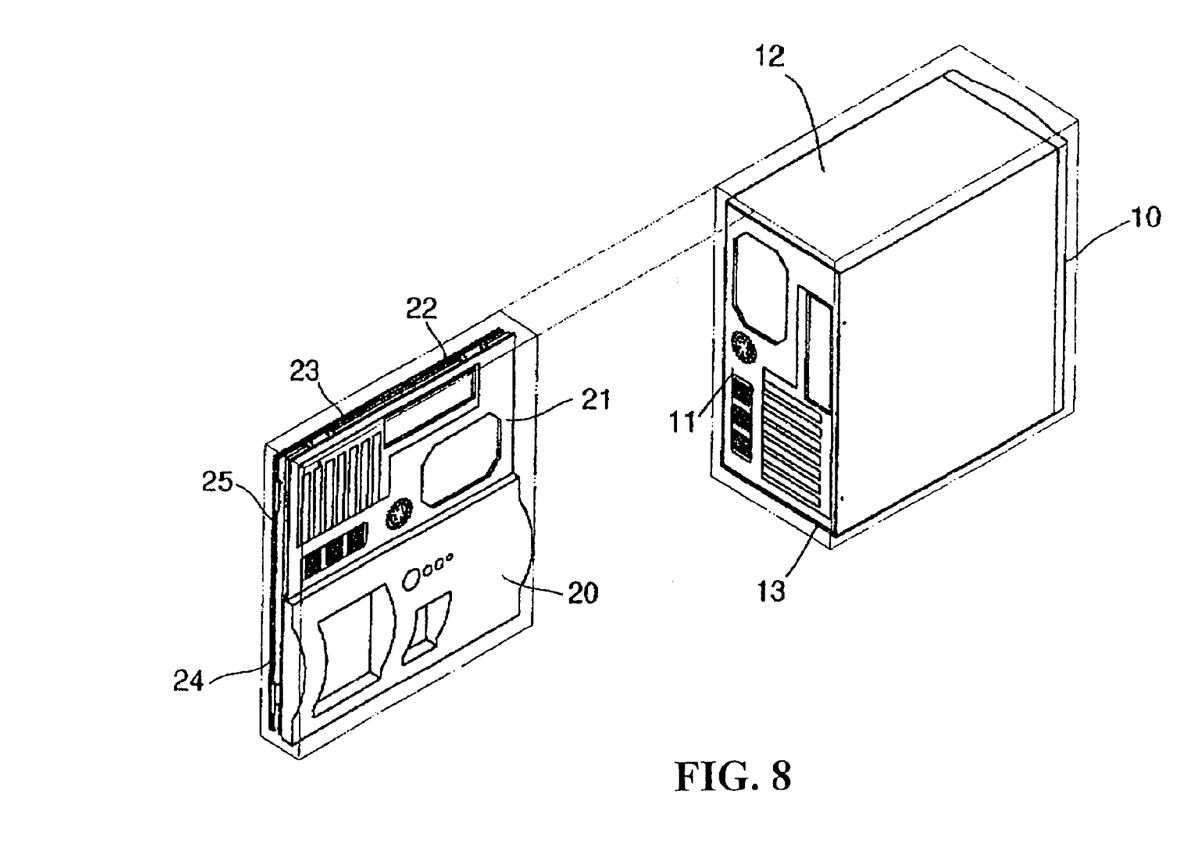
FIG. 8 shows a comparison between of the present computer housing with that of a conventional computer housing.

Accordingly, the advantages of the present inventions are as follows:

(a) The space occupied by the computer housing is small and the cost of shipping or transportation cost is thus minimized. In accordance with the present invention, the structure of the computer housing can be stacked on each other as the housing can be spread out substantially as a flat surface. Thus, the total numbers of the computer housing can be increased for each shipment and the cost of transportation is reduced (as shown in FIG. 8)

(b) Easy assemble and maintenance.

When assembling the computer housing, the front side board 20, the rear side board 21, the top side board 22, the bottom side board 23, the right side board 25, are folded and a plurality of screws are used to mount the connection edges of the side boards. Accordingly, when assembly, the required screws for connection are limited and the assembly of the side boards are easy and simple. Additionally, if the computer needs maintenance, the screws at the right side board 25 are unloaded and the right side board 25 is then opened. Thus, the damage parts within the computer housing are easily accessible for maintenance.

Although the invention has been explained in relation to its preferred embodiment, it is to be understood that many other possible modifications and variations can be made without departing from the spirit and scope of the invention as hereinafter claimed.

I claim:

1. A structure of a computer housing comprising a front side board, a rear side board, a top side board, a bottom side board, a left side board, and a right side board, characterized in that a plurality of pivot members are hingedly disposed along the edges of the respective side boards, and the side boards are arranged adjacent to other side boards, a plurality of securing seat plates are provided on the front side board for the mounting of an optical disc, a hard disc and soft disc, a holding seat plate is disposed on the rear side board for the mounting of a power source supply, and the plurality of the pivot members are formed along the edges of the front side board and the rear side board, such that the computer housing can be spread out a flat plane before forming into a box-like casing, wherein the power source supply is provided with an engaging rod at the bottom section of lateral sides thereof for mounting of the power supply onto the rear side board.

* * * * *